(12) United States Patent
Khanuja et al.

(10) Patent No.: US 11,808,617 B2
(45) Date of Patent: Nov. 7, 2023

(54) MEASUREMENT CIRCUIT FOR A BODY WEIGHT MEASURING APPARATUS FOR MEASURING BODY WEIGHT DISTRIBUTION

(71) Applicant: CAREMATIX, INC., Chicago, IL (US)

(72) Inventors: Sukhwant Singh Khanuja, Chicago, IL (US); Deepak Pandey, Chicago, IL (US); Steven Murakami, Chicago, IL (US)

(73) Assignee: CAREMATIX, INC.

( * ) Notice: Subject to any disclaimer, the term of this patent is extended or adjusted under 35 U.S.C. 154(b) by 149 days.

(21) Appl. No.: 17/216,560

(22) Filed: Mar. 29, 2021

(65) Prior Publication Data

US 2022/0307893 A1 Sep. 29, 2022

(51) Int. Cl.
*G01G 19/44* (2006.01)
*G01G 23/38* (2006.01)
*G01G 21/28* (2006.01)

(52) U.S. Cl.
CPC .......... *G01G 19/44* (2013.01); *G01G 21/283* (2013.01); *G01G 23/38* (2013.01)

(58) Field of Classification Search
CPC .......... G01G 19/44–50; G01G 21/283; G01G 23/01; G01G 23/38
See application file for complete search history.

(56) References Cited

U.S. PATENT DOCUMENTS

| | | | |
|---|---|---|---|
| 6,843,109 B2 * | 1/2005 | Nakada | G01M 1/122 73/65.01 |
| 11,215,499 B1 * | 1/2022 | Polish | G01D 18/00 |
| 2012/0169501 A1 * | 7/2012 | Cipriano | G01G 19/445 702/19 |
| 2015/0101870 A1 * | 4/2015 | Gough | G01N 33/5011 177/210 R |
| 2021/0169233 A1 * | 6/2021 | Tsern | A47C 27/061 |

* cited by examiner

*Primary Examiner* — Randy W Gibson
(74) *Attorney, Agent, or Firm* — Barry Choobin; PATENT360LLC

(57) ABSTRACT

A measurement circuit of a body weight measuring apparatus is provided. The measurement circuit comprises a load sensing unit including at least one wheatstone bridge circuit for generating a load information comprising at least one of: a left-side weight, a right-side weight, an anterior-side weight, and a posterior-side weight in the form of an output voltage, upon application of a load. The load sensing unit is powered by an input excitation voltage across the at least one wheatstone bridge circuit. The measurement circuit includes an amplifier circuit to amplify the output voltage to generate an amplified output, an analog to digital converter circuit for converting the amplified output to a digital representation of the weight of the load, and a microcontroller to receive and transmit the digital representation of the weight of the load to a server for computing an exact weight of the load.

8 Claims, 5 Drawing Sheets

213

MEASUREMENT CIRCUIT FOR A BODY WEIGHT MEASURING APPARATUS FOR MEASURING BODY WEIGHT DISTRIBUTION

BACKGROUND

Technical Field

The embodiments herein are generally related to a measuring device. The embodiments herein are particularly related to a measurement circuit for a body weight measuring apparatus. The embodiments herein are more particularly related to a measurement circuit for a body weight measuring apparatus for measuring a weight distribution of body in left side and right side to check weight distribution between legs or measure the distribution between toes and heel (front and back).

Description of the Related Art

Typically, weight of a person is generally referred to as a body weight of the person. Scientifically, a weight of any object is the total mass of the object and an effect of gravity on the object. The unit of weight may for example be kilograms (kg), pounds (lb.), or stones (st). There are several known techniques for measuring an accurate weight of an object, however the known techniques do not provide any indication of weight distribution Moreover, known weight scales do not provide measurements of postural sway and also does not provide accurate weight distribution between front toes and back heels.

Hence, there is a need for a measuring device that accurately measures weight of the user while taking into account various points of load on the measuring device due to postural sway or the user not being able to place the feet completely on the measuring device or in a steady pose and which also takes into account weight fluctuations due to unsteady position of the user on the measuring device. Still there is a need for a measurement circuit for a body weight measuring apparatus for measuring a weight distribution of body in left side and right side to check weight distribution between legs. Yet there is a need for a measurement circuit for a body weight measuring apparatus for measuring a weight distribution of body between toes and heel (front and back).

The abovementioned shortcomings, disadvantages and problems are addressed herein and which will be understood by reading and studying the following specification.

Objectives of the Embodiments Herein

The primary object of the embodiments herein is to develop a measuring device that accurately measures weight of the user while taking into account various points of load on the measuring device due to postural sway or the user not being able to place the feet completely on the measuring device or in a steady pose on the measuring device.

Another object of the embodiments herein is to develop a measurement circuit for a body weight measuring apparatus for measuring a weight distribution of body in left side and right side to check weight distribution between legs to identify a bad knee.

Yet another object of the embodiments herein is to develop a measurement circuit for a body weight measuring apparatus for measuring a weight distribution of body between toes and heel (front and back) to identify a bad toe.

Yet another object of the embodiments herein is to develop a measurement circuit to measure a left-side weight, a right-side weight, a posterior weight, an anterior weight and a total weight. The total weight shall be determined as the sum of a left-side weight, a right-side weight or sum of the posterior weight and the anterior weight.

Yet another object of the embodiments herein is to develop a measurement circuit to sample and time stamp each of the left-side weight, the right-side weight, the anterior-weight and the posterior-side weight sampled at a plurality of instances of time based on a sampling information and store the time stamped digital representation of the weight for subsequent transmission to a server.

Yet another object of the embodiments herein is to develop a measurement circuit for the body weight measuring apparatus that facilitates accurate weight measurements while taking into account postural sway of the load (such as a user with age related issue or medical issues) when the load fails to remain steady on the body weight measuring apparatus.

Yet another object of the embodiments herein is to develop a measurement circuit for the body weight measuring apparatus that receives configuration information from server for operation.

These and other objects and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a body weight measuring apparatus that includes a load sensing unit configured to measure a distributed weight of the load across various points on the body weight measuring apparatus so as to enable accurate weight measurements while taking into account postural sway of the load (such as a user with age related issue or medical issues) when the load fails to remain steady on the body weight measuring apparatus. The body weight measuring apparatus of the present technology includes at least one wheatstone bridge circuit for measuring distributed weights of the load across various corners of the body weight measuring apparatus and an amplifier circuit that adds the distributed weights measurements at various corners to generate an accurate total weight of the load.

According to an embodiment herein, a measurement circuit of a body weight measuring apparatus is provided for measuring a weight distribution of body in left side and right side to check weight distribution between legs to identify a bad knee. The measurement circuit comprises a load sensing unit, an amplifier circuit, an analog to digital converter circuit, and a microcontroller. The load sensing unit includes at least one wheatstone bridge circuit configured to generate a load information comprising at least one of: left-side weight, a right-side weight, a posterior-side weight, and an anterior-side weight, in the form of an output voltage, upon application of a load on the body weight measuring apparatus, wherein the load sensing unit is powered by an input excitation voltage across the at least one wheatstone bridge circuit. The amplifier circuit is operatively coupled to the load sensing unit and configured to receive the output voltage and amplify the output voltage to generate an amplified output. The analog to digital converter circuit is operatively coupled to the amplifier circuit for converting the amplified output to a digital representation of the weight of the load. The microcontroller is operatively coupled to the analog to digital converter and configured to receive the digital representation of the weight of the load and transmit the digital representation of the weight of the load to a server for computing an exact weight of the load. The microcontroller is configured to calibrate and read the analog to digital converter to receive the digital representation of the weight of the load.

According to an embodiment herein, each of the at least one Wheatstone bridge circuit is formed by at least a pair of load cells, and where each load cell comprises a positive strain gauge and a negative strain gauge and each load cell is disposed at a corner of the body weight measuring apparatus, and wherein the corner comprises a top left corner, a top right corner, a bottom left corner, and a bottom right corner.

According to an embodiment herein, each of the at least one Wheatstone bridge circuit comprises at least one of a first wheatstone bridge circuit formed by a top left load cell disposed on a left top corner of a body weight measuring apparatus and a bottom left load cell disposed on a bottom left corner of the body weight measuring apparatus, wherein the first Wheatstone bridge circuit is configured to measure the left-side weight of the load, a second wheatstone bridge circuit formed by a top right load cell disposed on a right top corner of the body weight measuring apparatus and a bottom right load cell disposed on a bottom right corner of the body weight measuring apparatus, wherein the second wheatstone bridge circuit is configured to measure the right-side weight of the load; a third wheatstone bridge circuit formed by the top right load cell and the top left load cell, wherein the third wheatstone circuit is configured to measure the anterior-side weight of the load and a fourth wheatstone bridge circuit formed by the bottom right load cell and the bottom left load cell, wherein the fourth wheatstone circuit is configured to measure the posterior-side weight of the load.

According to an embodiment herein, the amplifier circuit is configured to amplify the left-side weight, the right-side weight, the anterior-side weight and the posterior-side weight at a plurality of instances of time and wherein the microcontroller is configured to sample and time stamp each of the left-side weight, the right-side weight, the anterior-weight and the posterior-side weight sampled at the plurality of instances based on a configuration information received from the server and store the time stamped digital representation of the weight for subsequent transmission to the server.

According to an embodiment herein, the configuration information comprises at least a sampling period and total number of samples.

According to an embodiment herein, configuration information can be activation and deactivation of various features of weight measuring apparatus.

According to an embodiment herein, the server is configured to compute the exact weight of the load by adding the time stamped digital representations of the left-side weight, the right-side weight, the anterior-side weight and the posterior-side weight.

According to an embodiment herein, the microcontroller is further configured to receive a sway configuration information from the server and generate a score indicative of the load swaying on the scale and transmit the score to the server, wherein the score is processed by the server to determine a statistical information associated with a sway of the load on the body weight measuring apparatus, the statistical information comprising at least one of a mean, a variance, a skew, and a kurtosis.

According to an embodiment herein, a score indicative of the load swaying on the scale is generated upon enabling and configuring a sway function on the server by a user, wherein the microcontroller is configured to receive the sway configuration information during each instance of connection with the server.

According to an embodiment herein, the at least one wheatstone bridge circuit is a half wheatstone bridge circuit.

According to an embodiment herein, the at least one wheatstone bridge circuit is a quarter wheatstone bridge circuit.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

Figure 1:
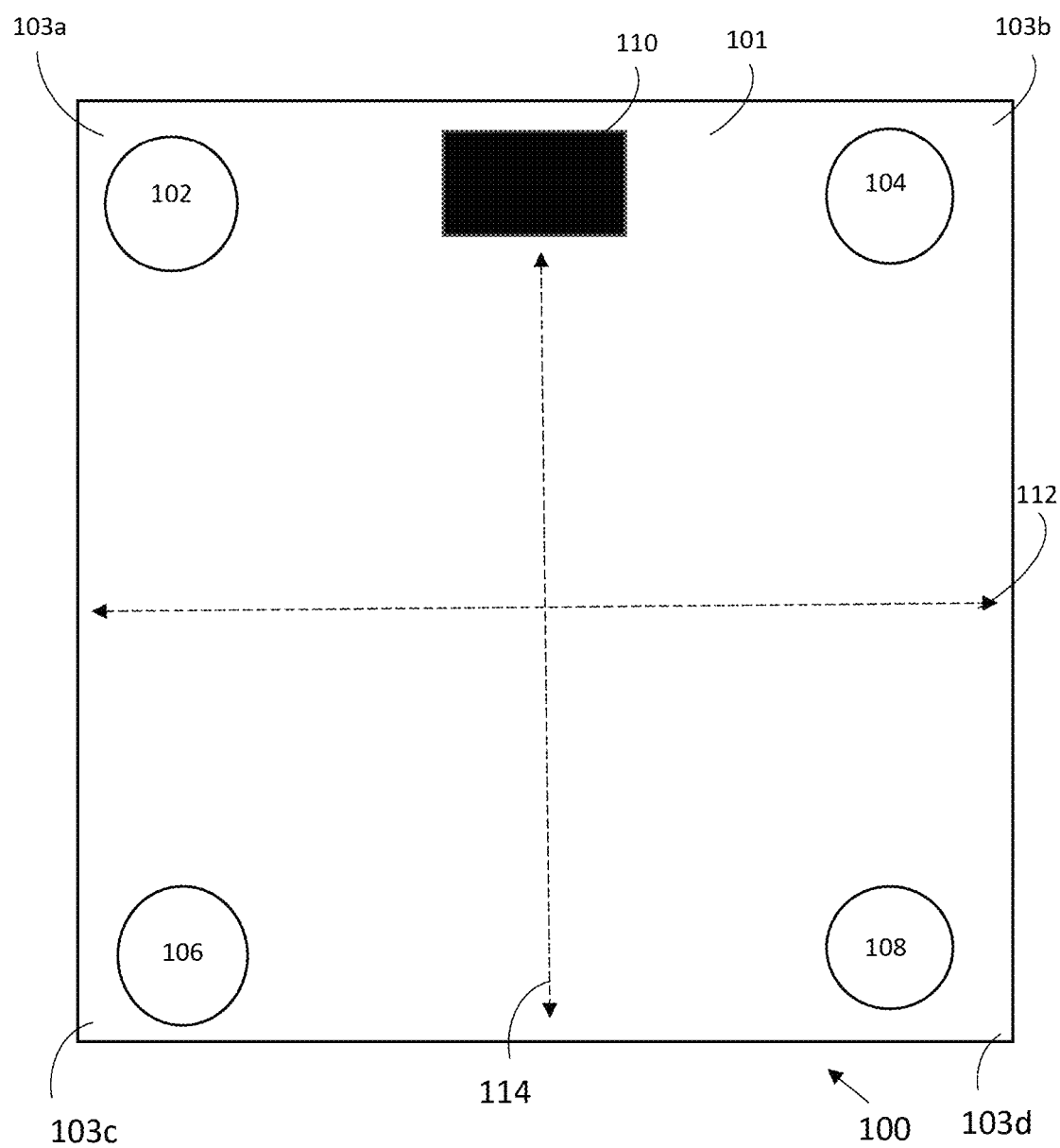
FIG. 1 illustrates an external top perspective view of the body weight measuring apparatus, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF PREFERRED EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The various embodiments herein provide a body weight measuring apparatus that includes a load sensing unit configured to measure a distributed weight of the load across various points on the body weight measuring apparatus so as to enable accurate weight measurements while taking into account postural sway of the load (such as a user with age related issue or medical issues) when the load fails to remain steady on the body weight measuring apparatus. The body weight measuring apparatus of the present technology includes a load sensing unit including at least one wheatstone bridge circuit for measuring distributed weights of the load across various regions on the body weight measuring apparatus such as, for example, a left-side weight, a right-side weight, an anterior-side weight, and a posterior-side weight. The body weight measuring apparatus of the present technology also includes an amplifier circuit that adds the distributed weights measurements at various corners to generate an accurate total weight of the load.

The various embodiments herein provide a body weight measuring apparatus that includes a load sensing unit configured to generate a load information including a left-side weight, a right-side weight, an anterior-side weight, and a posterior-side weight in the form of an output voltage, so as to enable accurate weight measurements while taking into account postural sway of the load (such as a user with age related issue or medical issues) when the load fails to remain steady on the body weight measuring apparatus. The body weight measuring apparatus of the present technology includes at least one wheatstone bridge circuit for measuring distributed weights of the load across various corners of the body weight measuring apparatus and an amplifier circuit that adds the distributed weights measurements at various corners to generate an accurate total weight of the load.

According to an embodiment herein, a measurement circuit of a body weight measuring apparatus is provided for measuring a weight distribution of body in left side and right side to check weight distribution between legs to identify a bad knee. The measurement device comprises a load sensing unit including at least one wheatstone bridge circuit configured to generate a load information comprising at least one of: a left-side weight, a right-side weight, an anterior-side weight, and a posterior-side weight, in the form of an output voltage, upon application of a load on the body weight measuring apparatus, wherein the load sensing unit is powered by an input excitation voltage across the at least one wheatstone bridge circuit. An amplifier circuit is operatively coupled to the load sensing unit and configured to receive the output voltage and amplify the output voltage to generate an amplified output. An analog to digital converter circuit is operatively coupled to the amplifier circuit for converting the amplified output to a digital representation of the weight of the load. A microcontroller is operatively coupled to the analog to digital converter and configured to receive the digital representation of the weight of the load and transmit the digital representation of the weight of the load to a server for computing an exact weight of the load. The microcontroller is configured to calibrate and read the analog to digital converter to receive the digital representation of the weight of the load.

According to an embodiment herein, each of the at least one Wheatstone bridge circuit is formed by at least a pair of load cells, and where each load cell comprises a positive strain gauge and a negative strain gauge and each load cell is disposed at a corner of the body weight measuring apparatus, and wherein the corner comprises a top left corner, a top right corner, a bottom left corner, and a bottom right corner.

According to an embodiment herein, each of the at least one Wheatstone bridge circuit comprises at least one of: a first wheatstone bridge circuit formed by a top left load cell disposed on a left top corner of a body weight measuring apparatus and a bottom left load cell disposed on a bottom left corner of the body weight measuring apparatus, wherein the first Wheatstone bridge circuit is configured to measure the left-side weight of the load, a second wheatstone bridge circuit formed by a top right load cell disposed on a right top corner of the body weight measuring apparatus and a bottom right load cell disposed on a bottom right corner of the body weight measuring apparatus, wherein the second wheatstone bridge circuit is configured to measure the right-side weight of the load; a third wheatstone bridge circuit formed by the top right load cell and the top left load cell, wherein the third wheatstone circuit is configured to measure the anterior-side weight of the load and a fourth wheatstone bridge circuit formed by the bottom right load cell and the bottom left load cell, wherein the fourth wheatstone circuit is configured to measure the posterior-side weight of the load.

According to an embodiment herein, the amplifier circuit is configured to amplify the left-side weight, the right-side weight, the anterior-side weight and the posterior-side weight at a plurality of instances of time and wherein the microcontroller is configured to sample and time stamp each of the left-side weight, the right-side weight, the anterior-weight and the posterior-side weight sampled at the plurality of instances based on a configuration information received from the server and store the time stamped digital representation of the weight for subsequent transmission to the server.

According to an embodiment herein, the configuration information comprises at least a sampling period and total number of samples.

According to an embodiment herein, configuration information can be activation and deactivation of various features of weight measuring apparatus including wheatstone bridge.

According to an embodiment herein, the server is configured to compute the exact weight of the load by adding the time stamped versions of the left-side weight, the right-side weight, the anterior-side weight and the posterior-side weight. The measurement circuit of the body weight measuring apparatus of claim 1, wherein the microcontroller is further configured to receive a sway configuration information from the server and generate a score indicative of the load swaying on the scale and transmit the score to the server, wherein the score is processed by the server to determine a statistical information associated with a sway of the load on the body weight measuring apparatus, the statistical information comprising at least one of a mean, a variance, a skew, and a kurtosis.

According to an embodiment herein, a score indicative of the load swaying on the scale is generated upon enabling and configuring a sway function on the server by a user, wherein the microcontroller is configured to receive the sway configuration information during each instance of connection with the server.

According to an embodiment herein, the at least one wheatstone bridge circuit is a half wheatstone bridge circuit.

According to an embodiment herein, the at least one wheatstone bridge circuit is a quarter wheatstone bridge circuit.

The various embodiments disclosed herein provide a body weight measuring apparatus. Referring now to the drawings, and more particularly to FIGS. 1 through 2C, where similar reference characters denote corresponding features consistently throughout the figures, preferred embodiments are shown.

FIG. 1 illustrates an external top perspective view of the body weight measuring apparatus 100, according to an embodiment herein. In an embodiment, the body weight measuring apparatus 100 includes a weighing plate 101. In an embodiment, the weighing plate 101 is rectangular and can be divided into four corners including for example, a top left corner 102, a top right corner 104, a bottom left corner 106 and a bottom right corner 108, where the weight of a load (e.g., a user) can be measured using the body weight measuring apparatus 100 of the present technology. The weighing plate 101 can be made of for example, a fiber or a glass material. When a user stands on weighing plate 101, the body weight measuring apparatus 100 measures the weight of the user quickly. The body weight measuring apparatus 100 also includes a digital display 110 for displaying the weight of the user/load.

According to an embodiment herein, the body weight measuring apparatus 100 also includes a power source, such as a battery. The body weight measuring apparatus 100 may further include a battery compartment for storing one or more batteries. In several embodiments, there may also be a battery inside the body weight measuring apparatus 100 for powering a time clock. The weighing plate 101 further includes a measurement circuit disposed below the weighing plate 101 for measuring the weight of a load placed over the weighing plate 101.

The body weight measuring apparatus 100 is configured to measure a left-side weight, a right-side weight, a posterior-weight, an anterior-weight and/or a total weight. The total weight shall be determined as the sum of either the left-side weight and the right-side weight or the posterior-weight and the anterior-weight. In an embodiment, four load cells are disposed below the top left corner 102, the top right corner 104, the bottom left corner 106 and the bottom right corner 108 of the weighing plate 101. The body weight measuring apparatus 100 is configured to measure weight along each of X-axis 112 (the left-side weight and the right-side weight) and Y-axis 114 (the posterior-weight and the anterior-weight). Each load cell includes at least one wheatstone bridge circuit. The body weight measuring apparatus 100 is also configured to perform a sway measurement, which requires the user to stay on the weighing plate 101 while the body weight measuring apparatus 100 collects weight data from the four load cells. The weight data is timestamped and stored for transmission to a server at a future time. The weight data includes the left-side weight and the right-side weight, the posterior-weight, the anterior-weight, sampled weight data from left side, sampled weight data from right side, sampled weight data from posterior side, and sampled weight data from anterior side.

Figure 2A:
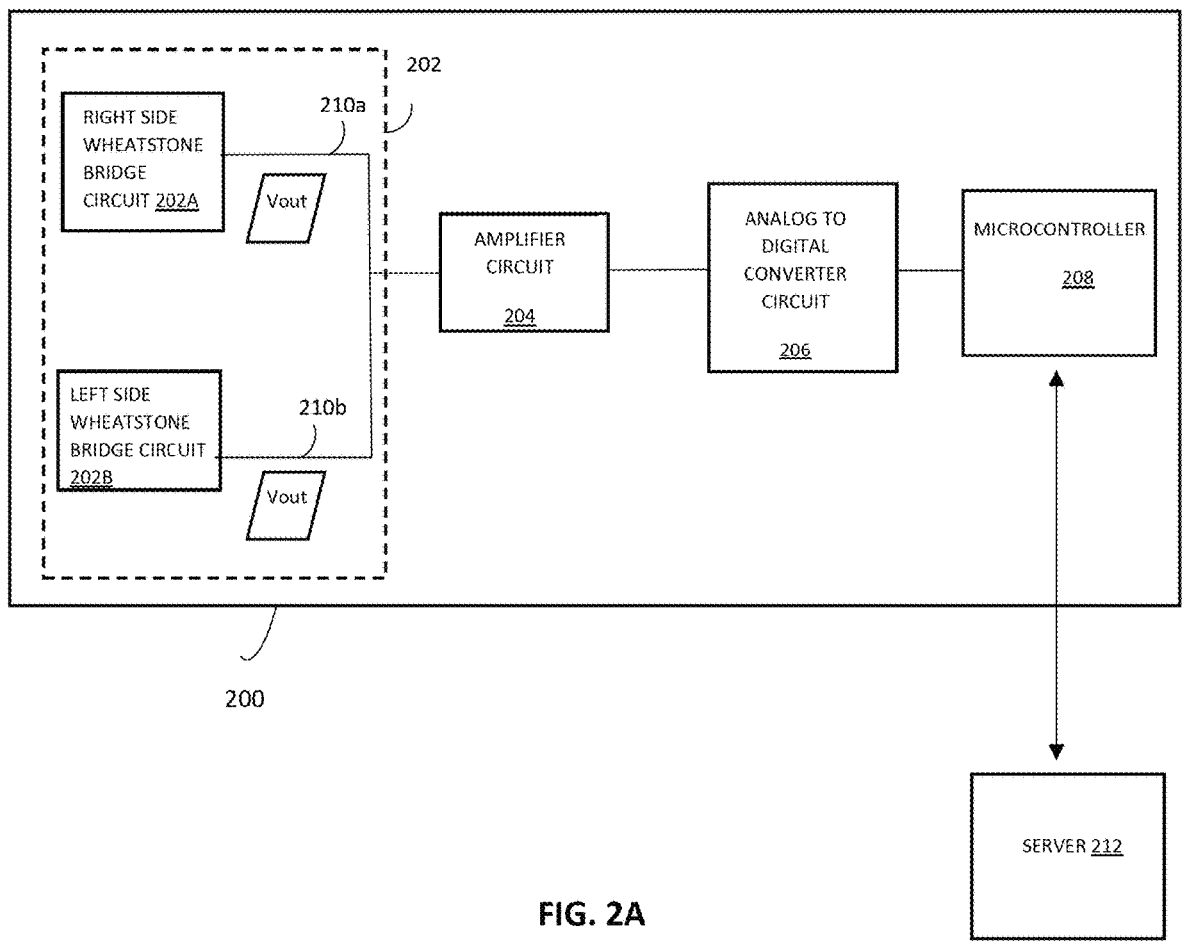
FIG. 2A illustrates a measurement circuit of the body weight measuring apparatus, according to an embodiment herein.

FIG. 2A illustrates a measurement circuit 200 of the body weight measuring apparatus 100, in accordance with an embodiment. As depicted in FIG. 2A, the measurement circuit 200 of the body weight measuring apparatus 100 includes a load sensing unit 202, an amplifier 204, an analog to digital converter circuit 206, and a microcontroller 208. The load sensing unit includes at least one wheatstone bridge circuit (such as for example, a right-side wheatstone bridge circuit 202A and a left-side wheatstone bridge circuit 202B) configured to generate a load information comprising at least one of: the left-side weight, the right-side weight, the posterior-weight and the anterior-weight, in the form of an output voltage and upon application of a load on the body weight measuring apparatus 100. As used herein the term "wheatstone bridge" refers to an electrical equivalent of two parallel voltage divider circuits, where two resistances R1 and R2 compose one voltage divider circuit and two other resistances R3 and R4 compose a second voltage divider circuit. An output of the wheatstone bridge is measured between the middle nodes of the two voltage divider circuits. A physical phenomenon, such as change in strain applied to a specimen changes the resistance of the sensing elements in the wheatstone bridge. Strain gauge configuration are arranged as wheatstone bridges. The strain gauge is the collection of all the active elements of the wheatstone bridge. The strain gauge configurations include a quarter wheatstone bridge, a half wheatstone bridge, and a full wheatstone bridge, determined by a number of active element legs in the wheatstone bridge.

Figure 2B:
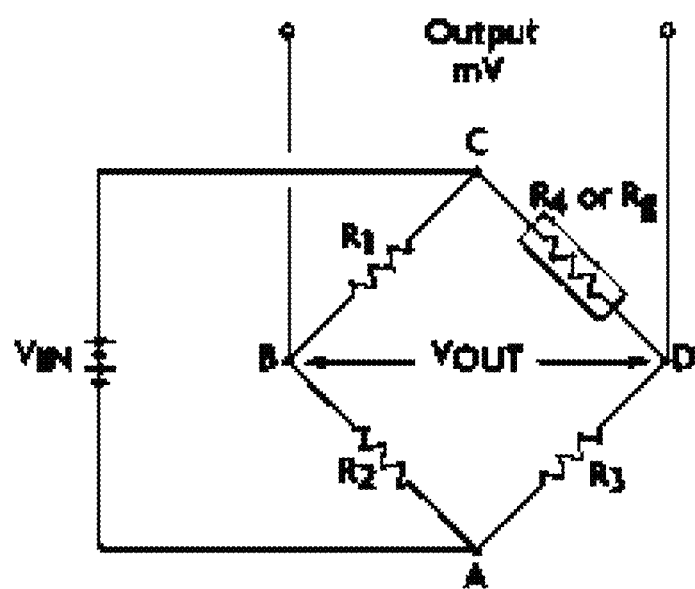
FIG. 2B illustrates an exemplary wheatstone bridge circuit, according to an embodiment herein.

FIG. 2B illustrates an exemplary wheatstone bridge circuit 213, in accordance with an embodiment. Consider if the resistances R1, R2, R3, and R4 are equal, and a voltage, VIN (input excitation voltage) is applied between points A and C, then the output between points B and D will show no potential difference. However, if R4 is changed to some value which does not equal R1, R2, and R3, the bridge will become unbalanced and a voltage will exist at the output terminals. In a G-bridge configuration, a variable strain sensor has resistance Rg, while the other arms are fixed value resistors. The sensor, however, can occupy one, two, or four arms of the wheatstone bridge circuit 213, depending on the application. The total strain, or output voltage of the circuit (Vout) is equivalent to the difference between the voltage drop across R1 and R4, or Rg and is given by equation (1):

$$V\text{out}=V\text{in}*((R3/(R3+Rg))-(R2/(R1+R2))) \quad (1)$$

An input excitation voltage is applied across the at least one wheatstone bridge circuit. In an embodiment, each of the at least one wheatstone bridge circuit is formed by at least a pair of load cells, and where each load cell comprises a positive strain gauge and a negative strain gauge and each load cell is disposed at a corner of the body weight measuring apparatus, and where the corner comprises a top left corner, a top right corner, a bottom left corner, and a bottom right corner.

The amplifier circuit 204 is operatively coupled to the load sensing unit 202 and is configured to receive the output voltage (for example, an output voltage 210a of the right-side wheatstone bridge circuit 202A and an output voltage 210b of the left-side wheatstone bridge circuit 202B. The amplifier circuit 204 is configured to amplify the output voltage to generate an amplified output. The analog to digital converter circuit 206 is operatively coupled to the amplifier circuit 204 to receive the amplified output for converting the amplified output to a digital representation of the weight of the load. The microcontroller 208 is operatively coupled to the analog to digital converter circuit 206 and is configured to receive the digital representation of the weight of the load and transmit the digital representation of the weight of the load to a server 212 for computing an exact weight of the load. The server 212 is configured to compute the exact weight of the load by adding the left-side weight, the right-side weight, the anterior-side weight, and the posterior-side weight. In an embodiment, the microcontroller 208 is further configured to calibrate and read the analog to digital converter to receive the digital representation of the weight of the load.

Figure 3:
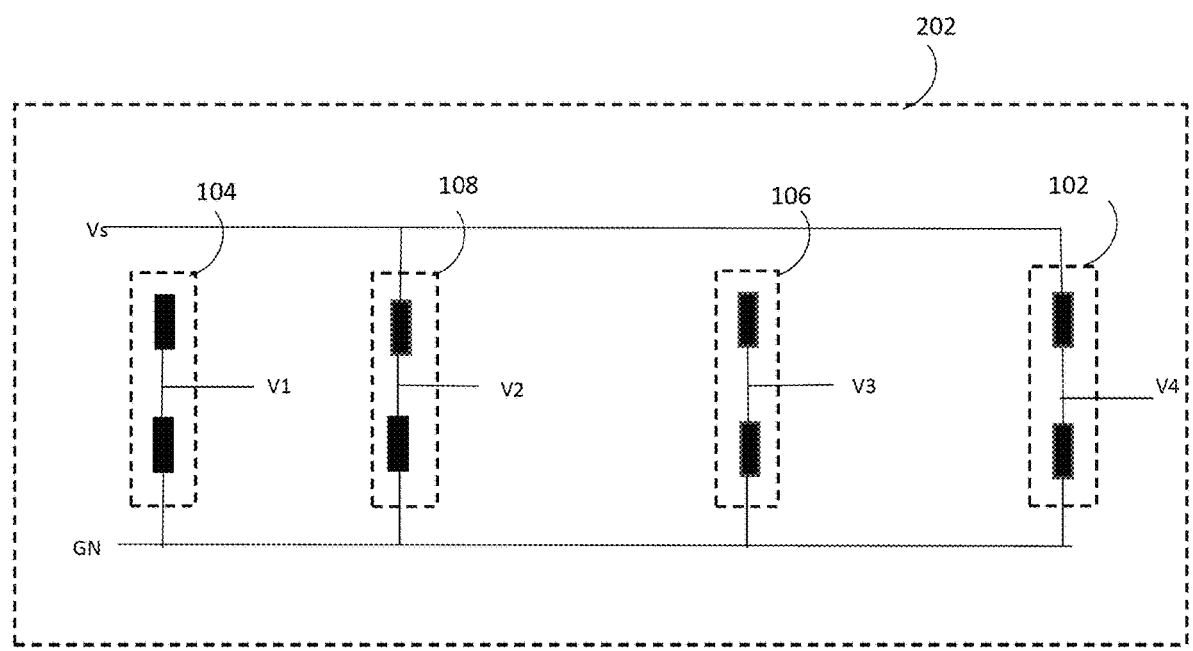
FIG. 3 illustrates the load sensing unit, in accordance with another embodiment herein.

FIG. 3 illustrates the load sensing unit 202, in accordance with another embodiment. The load sensing unit 202 as depicted in FIG. 3 comprises a first load cell 104, a second load cell 108, a third load cell 106, and a fourth load cell 102. An input excitation voltage Vs is applied across each of the load cells 102, 104, 106, 108 and the output voltage V1, V2, V3, and V4 respectively are generated by the first load cell 104, the second load cell 108, the third load cell 106, and the fourth load cell 102. Various combinations of the output voltage V1-V4 are used to realize a plurality of wheatstone bridge circuits for measuring the left-side weight, the right-side weight, the anterior-side weight, and the posterior-side weight.

Figure 4:
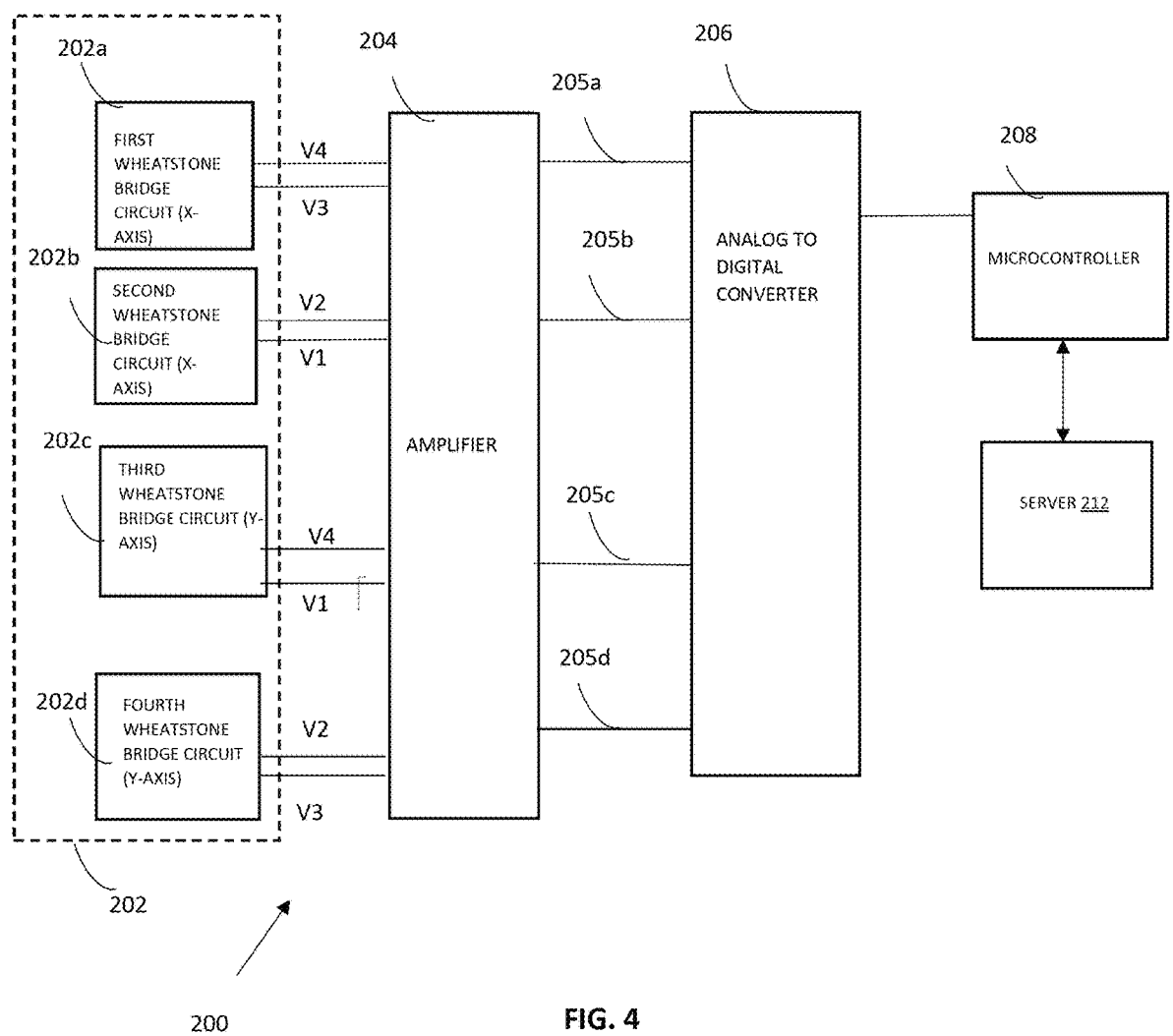
FIG. 4 illustrates a measurement circuit of the body weight measuring apparatus, in accordance with another embodiment herein.

FIG. 4 illustrates a measurement circuit 200 of the body weight measuring apparatus 100, in accordance with another embodiment. The measurement circuit 200 includes a load sensing unit 202. The load sensing unit 202 includes a first wheatstone bridge circuit 202*a*, a second wheatstone bridge circuit 202*b*, a third wheatstone bridge circuit 202*c*, and a fourth wheatstone bridge circuit 202*d*. In an embodiment, each of the first wheatstone bridge circuit 202*a*, the second wheatstone bridge circuit 202*b*, the third wheatstone bridge circuit 202*c*, and the fourth wheatstone bridge circuit 202*d* is a half wheatstone bridge circuit. In another embodiment, each of the first wheatstone bridge circuit 202*a*, the second wheatstone bridge circuit 202*b*, the third wheatstone bridge circuit 202*c*, and the fourth wheatstone bridge circuit 202*d* is a quarter wheatstone bridge circuit. The first wheatstone bridge circuit 202*a* is formed by a top left load cell disposed on a left top corner of a body weight measuring apparatus and a bottom left load cell disposed on a bottom left corner of the body weight measuring apparatus, where the first wheatstone bridge circuit 202*a* is configured to measure the left-side weight of the load. The second wheatstone bridge circuit 202*b* is formed by a top right load cell disposed on a right top corner of the body weight measuring apparatus and a bottom right load cell disposed on a bottom right corner of the body weight measuring apparatus, where the second wheatstone bridge circuit 202*b* is configured to measure right-side weight of the load. The third wheatstone bridge circuit 202*c* is formed by the top right load cell and the top left load cell, where the third wheatstone circuit is configured to measure an anterior-side weight of the load. The fourth wheatstone bridge circuit 202*d* is formed by the bottom right load cell and the bottom left load cell, where the fourth wheatstone circuit 202*d* is configured to measure a posterior-side weight of the load. The amplifier circuit 204 of the measurement circuit 200 is configured to amplify the left-side weight, the right-side weight, the anterior-side weight and the posterior-side weight at different instances of time. The amplifier circuit 204 amplifies the output voltages V4 and V3 at a first instance of time, the output voltages V2 and V1 at a second instance of time, the output voltages V4 and V1 at a third instance of time, and output voltages V2 and V3 at a fourth instance of time and generates amplified output signals 205*a*-*d* respectively.

The analog to digital converter 206 converts each of the amplified output signals 205*a*-*d* to generate a digital representation of the weight of the load. The microcontroller 208 receives the digital representation of the weight of the load and transmits the digital representation of the weight of the load to a server 212 for computing an exact weight of the load. Further, the microcontroller 208 is configured to calibrate and read the analog to digital converter 206 and is configured to sample and time stamp each of the left-side weight, the right-side weight, the anterior-weight and the posterior-side weight sampled at a plurality of instances of time based on a sampling information received from the server 212 and store the time stamped digital representation of the weight for subsequent transmission to the server 212. The sampling information comprises at least a sampling period and total number of samples. In an embodiment, the sampling information can be manually set by a user on the server 212. The server 212 is configured to compute the exact weight of the load by adding the time stamped versions of the left-side weight, the right-side weight, the anterior-side weight and the posterior-side weight. The microcontroller 208 is configured to calibrate and add the received values from the left side and right side weights and display the total weight on the weight scale display 110.

In an embodiment, the measurement circuit 200 is configured to perform a sway measurement in addition to measuring the weight of the load. In several embodiments, the sway measurement may be available after a user has enabled and configured the sway function at the server 212 otherwise the measurement circuit 200 will operate as a weight scale alone. In an embodiment, the user is allowed to enable the sway feature using a server interface on the server 212. The user is also allowed to set the sampling information including a sampling period and a total number of samples to collect via the server interface. The next time the measurement circuit 200 communicates with the server 212 it will receive a new sampling configuration. After that, whenever the user steps onto the body weight measuring apparatus 100, the body weight measuring apparatus 100 will generate a weight reading and beep (e.g 1 beep) indicating that the weight reading was taken, then it will beep (e.g 2 beeps) indicating that a sway measurement is beginning. When the scale has completed collecting the data it will inform the user by emitting beeps (e.g., 2 beeps). The user is expected to stay on the scale during the sway measurement. At the end of the measurement, the user weight will be displayed and the measurement circuit 200 will send the collected data to the server, 212. Subsequently, the measurement circuit 200 goes into a sleep mode.

In an embodiment, the microcontroller 208 is configured to receive the sway configuration information from the server 212 and generate a score indicative of the load swaying on the scale and transmit the score to the server 212. The score is processed by the server 212 to determine a statistical information associated with a sway of the load on the body weight measuring apparatus 100. The statistical information comprises at least one of a mean, a variance, a skew, and a kurtosis. The statistical information provides information regarding sway of the user/load on the body weight measuring apparatus 100.

Various embodiments of the present technology may be used in various medical streams such as orthotics and prosthetics and rehabilitation of stroke, perhaps other areas.

The body weight measuring apparatus enables measuring a change in the center of mass of a user positioned on body weight measuring apparatus. The body weight measuring apparatus of the present technology captures the actual weight of a user/load independently of the data captured for the sway measurement. The body weight measuring apparatus captures an actual weight of the user and subsequently collects the data for the sway measurement and transmits the sway measurement samples to the server where the weight data and the sway measurement is processed and thereby facilitates monitoring of sway measurement associated with a particular user on the server. The monitored sway measurement may be used in various medical applications such as orthotics and prosthetics and rehabilitation of stroke, perhaps other areas. Moreover, the measurement circuit of the body weight measurement apparatus designed based on Wheatstone bridge circuit constitutes an inexpensive implementation of a weighing scale and hence is more economic.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

Although the embodiments herein are described with various specific embodiments, it will be obvious for a person skilled in the art to practice the embodiments herein with modifications. The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A measurement circuit of a body weight measuring apparatus comprising:

a load sensing unit comprising at least one wheatstone bridge circuit configured to generate a load information comprising at least one of: a left-side weight, a right-side weight, an anterior-side weight, and a posterior-side weight, in the form of an output voltage, upon application of a load on the body weight measuring apparatus, wherein the load sensing unit is powered by an input excitation voltage across the at least one wheatstone bridge circuit;

an amplifier circuit operatively coupled to the load sensing unit and configured to receive the output voltage and amplify the output voltage to generate an amplified output;

an analog to digital converter circuit operatively coupled to the amplifier circuit for converting the amplified output to a digital representation of the weight of the load;

a microcontroller operatively coupled to the analog to digital converter and configured to receive the digital representation of the weight of the load and transmit the digital representation of the weight of the load to a server for computing an exact weight of the load, wherein the microcontroller is configured to calibrate and read the analog to digital converter to receive the digital representation of the weight of the load;

wherein the microcontroller is further configured to receive a sway configuration information from the server and generate a score indicative of the load swaying and transmit the score to the server, and wherein the score is processed by the server to determine a statistical information associated with a sway of the load on the body weight measuring apparatus, the statistical information comprising at least one of a mean, a variance, a skew, and a kurtosis, and wherein score indicative of the load swaying on the scale is generated upon enabling and configuring a sway function on the server by a user, wherein the microcontroller is configured to receive the sway configuration information during each instance of connection with the server.

2. The measurement circuit of the body weight measuring apparatus of claim 1, wherein each of the at least one wheatstone bridge circuit is formed by at least a pair of load cells, wherein each load cell comprises a positive strain gauge and a negative strain gauge and each load cell is disposed at a corner of the body weight measuring apparatus, and wherein the corner comprises a top left corner, a top right corner, a bottom left corner, and a bottom right corner.

3. The measurement circuit of the body weight measuring apparatus of claim 1, wherein the at least one wheatstone bridge circuit comprises at least one of:

a first wheatstone bridge circuit formed by a top left load cell disposed on a left top corner of a body weight measuring apparatus and a bottom left load cell disposed on a bottom left corner of the body weight measuring apparatus, wherein the first Wheatstone bridge circuit is configured to measure the left-side weight of the load a second wheatstone bridge circuit formed by a top right load cell disposed on a right top corner of the body weight measuring apparatus and a bottom right load cell disposed on a bottom right corner of the body weight measuring apparatus, wherein the second wheatstone bridge circuit is configured to measure right-side weight of the load;

a third wheatstone bridge circuit formed by the top right load cell and the top left load cell, wherein the third wheatstone circuit is configured to measure an anterior-side weight of the load; and a fourth wheatstone bridge circuit formed by the bottom right load cell and the bottom left load cell, wherein the fourth wheatstone circuit is configured to measure a posterior-side weight of the load.

4. The measurement circuit of the body weight measuring apparatus of claim 3, wherein the amplifier circuit is configured to amplify the left-side weight, the right-side weight, the anterior-side weight and the posterior-side weight at a plurality of instances of time and wherein the microcontroller is configured to sample and time stamp each of the left-side weight, the right-side weight, the anterior-weight and the posterior-side weight sampled at the plurality of instances of time based on a sampling information received from the server and store the time stamped digital representation of the weight for subsequent transmission to the server.

5. The measurement circuit of the body weight measuring apparatus of claim 4, wherein the sampling information comprises at least a sampling period and a total number of samples.

6. The measurement circuit of the body weight measuring apparatus of claim 4, wherein the server is configured to compute the exact weight of the load by adding the time stamped digital representations of the left-side weight, the right-side weight, the anterior-side weight and the posterior-side weight.

7. The measurement circuit of the body weight measuring apparatus of claim 1, wherein the at least one wheatstone bridge circuit is a half wheatstone bridge circuit.

8. The measurement circuit of the body weight measuring apparatus of claim 1, wherein the at least one wheatstone bridge circuit is a quarter wheatstone bridge circuit.

* * * * *